O. A. SMITH.
FRICTION CLUTCH OPERATING MECHANISM.
APPLICATION FILED JULY 14, 1910.
1,020,459.
Patented Mar. 19, 1912.
2 SHEETS—SHEET 1.
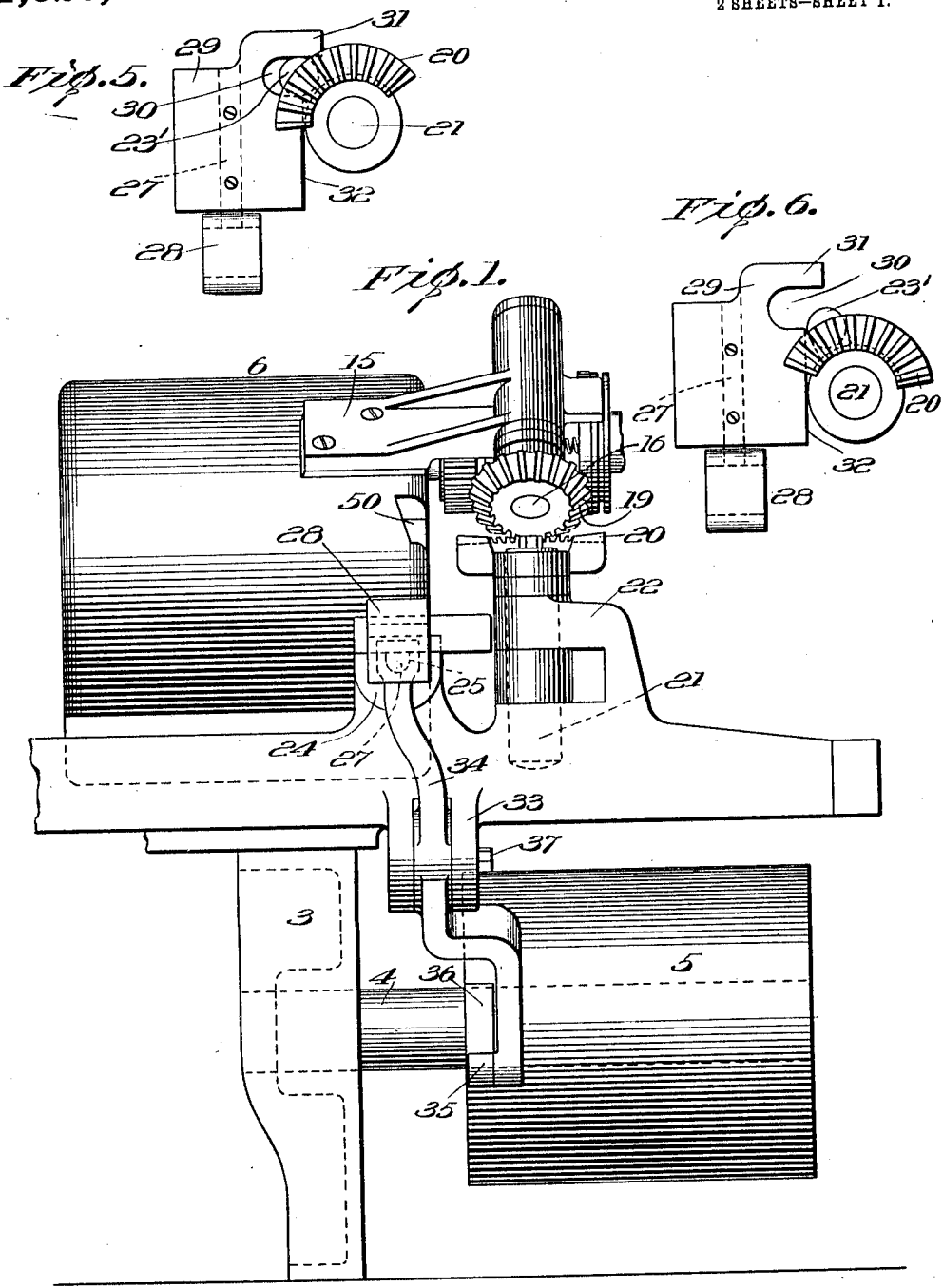
Witnesses:
F. E. Boyce
George F. Purcell
Inventor:
Oscar A. Smith
By [signature]
Attorney.

O. A. SMITH.
FRICTION CLUTCH OPERATING MECHANISM.
APPLICATION FILED JULY 14, 1910.
1,020,459.
Patented Mar. 19, 1912.
2 SHEETS—SHEET 2.
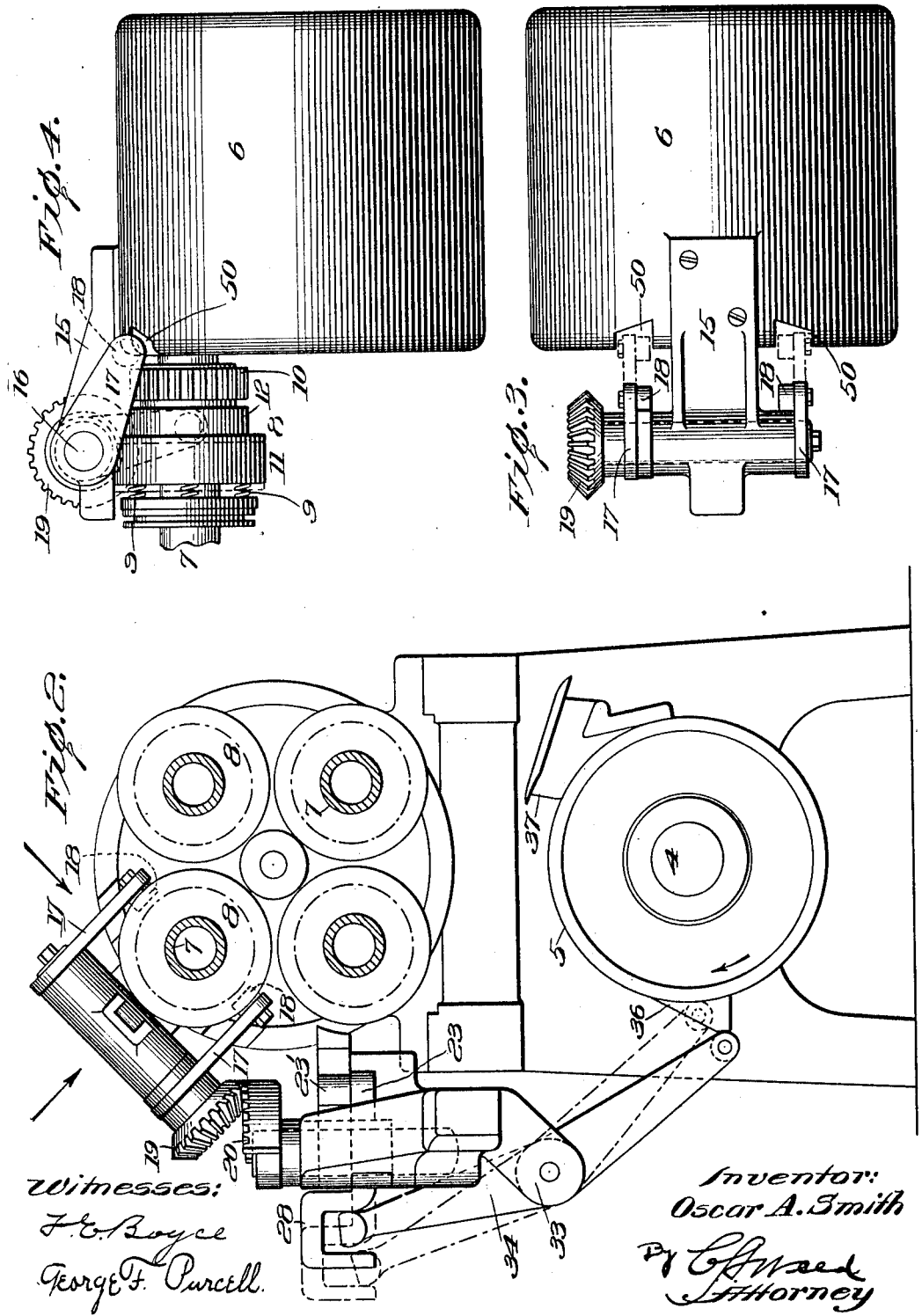
Witnesses:
F. E. Boyce
George F. Purcell
Inventor:
Oscar A. Smith
By C. F. Ward
Attorney

UNITED STATES PATENT OFFICE.

OSCAR A. SMITH, OF CLEVELAND, OHIO, ASSIGNOR TO THE NATIONAL-ACME MANUFACTURING COMPANY, OF CLEVELAND, OHIO, A CORPORATION OF OHIO.

FRICTION-CLUTCH-OPERATING MECHANISM.

1,020,459.      Specification of Letters Patent.      Patented Mar. 19, 1912.

Application filed July 14, 1910. Serial No. 571,955.

*To all whom it may concern:*

Be it known that I, OSCAR A. SMITH, a citizen of the United States, residing at Cleveland, in the county of Cuyahoga and State of Ohio, have invented certain new and useful Improvements in Friction-Clutch-Operating Mechanism, of which the following is a specification.

This invention relates to friction or friction-clutch operating mechanism for the rod spindles or multiple spindle screw machines, the object of the invention being to provide an improved mechanism of this character comparatively simple in construction and operation and effective in use.

In the drawings accompanying and forming part of this specification, Figure 1 is a side elevation of a portion of a multiple spindle screw machine; Fig. 2 is an end view of the mechanism shown in Fig. 1, looking from right to left; Fig. 3 is a top view of the turret casing with a part of this mechanism attached thereto; Fig. 4 is a right hand side view of the turret casing and the mechanism attached thereto shown in Fig. 2 and a portion of one of the rod spindle mechanisms; and Figs. 5 and 6 are detail views of the cam slide in different positions.

Similar characters of reference indicate corresponding parts throughout the figures of the drawings.

This improved friction clutch operating mechanism, in the present application thereof, is intended for use in connection with the work spindle mechanism of a multiple spindle machine, it being located in position to coöperate with the rod spindles as each is sucessively carried into position to have the work carried thereby operated upon by a threading die, at which time it is desirable to stop the rotation of the spindle, which is normally rotating, and thus permit the threading die to perform the threading operation while the spindle and its work or rod are stationary, and to permit the continued rotation thereof after this threading is completed.

Only so much of a multiple spindle screw machine as is necessary to a proper illustration of this improved mechanism is shown herein, and this comprises in the present instance a portion of the bed 2, having a suitable support 3 carrying a cam shaft 4 on which a suitable cam drum 5 is mounted. The turret casing 6 for the rod or work spindles is rigidly secured to the bed in the usual manner.

In practice each rod spindle 7, four being shown herein, is provided with a suitable friction clutch operating mechanism 8, the members of which clutch operating mechanism are normally held in engagement by springs 9, the rod spindle being normally rotated by suitable gear mechanism of which the gear 10 forms a part. For the purpose of separating the clutch members and holding one of these members, as 11, out of engagement with its companion member 12, and for which purpose it is essential to compress the springs 9, the present improved friction clutch operating mechanism is provided. This comprises a bracket 15 rigidly secured to the turret casing 6 and carrying a shaft 16 on which is mounted a pair of levers 17 having projections or rolls 18 adapted to engage the member 11 of the friction clutch and shift it against the action of its springs 9 away from the clutch member 12. Carried by this shaft 16, at one end thereof, is a bevel gear 19 in mesh with a crown gear 20 mounted on the upper end of a shaft 21, which shaft is suitably supported by bearings carried by a bracket 22 mounted on the bed of the machine. Keyed to this shaft 21 is a crank lever 23 adapted to be shifted into different positions by a suitable cam mechanism thereby to partially rotate the crown gear and so rotate the bevel gear and shift the levers 17 into position either to separate the clutch members or to permit their engagement at the proper time.

The means for shifting the crank lever 23 comprises a cam slide actuated by the cam drum 5. In the present instance a boss or bracket 24 located at right angles to the turret casing 6 is provided with a semicircular opening 25 into which is fitted to slide easy a semicircular slide 27 having at its outer end a slotted or bifurcated head 28. On this slide 27 is mounted a cam 29, this being fastened to the flat or upper side of the slide 27 and resting on the top of the boss or bracket 24, this being suitably machined to form a proper sliding bearing for the cam 29. On the free end of the crank lever 23 is a suitable friction roll 23′ in position to be operated by the cam 29, for which purpose the latter is provided with a slot or recess 30, one wall of which, as 31, projects beyond the side face 32 of the cam. In a crotch bearing 33 carried by the bed 2 is hung an actuating lever 34, the upper end of which fits into the slotted head of the slide 27, while the lower end is provided with a roll 35 for engagement with a pair of cams 36 and 37 secured to the cam drum 5 on the cam shaft 4, the cam 36 being effective to operate the lever in one direction while the cam 37 is effective to operate it in the opposite direction. By this improved mechanism that particular friction clutch carried by the rod spindle with which the threading die is intended to coöperate may be opened or released until it is desired to close it again. In other words, as the work or rod spindles carried by the revoluble work turret supported in casing 6 are successively brought into position to have the clutch members thereof adjacent to the levers or arms 17 of this improved clutch operating mechanism this mechanism will be operated to release the clutch members and so stop the rod spindle, which is normally rotating, and permit the threading of the rod while such work or rod is stationary, in the following manner:

When the cam drum 5, traveling in the direction of the arrow, Fig. 2, carries its cam 36 into position to engage the roll 35 of the lever 34 it throws the upper end of this lever inwardly toward the turret casing and so shifts the slide 27 and thereby the cam 29 into position to shift the crank lever 23 from the position shown in Fig. 5 to that shown in Fig. 6, in which position it is held against further movement by the side face 32 of the cam thereby shifting the shaft 21 and partially rotating the crown gear mounted thereon, thereby to rotate the bevel gear 19, which in turn shifts the lever arms 17 mounted on the shaft 16 into position to engage the member 11 of the friction clutch members and move it against the action of its springs 9 and out of engagement with the member 12 of the clutch, thus stopping the rod spindle and so holding the work or rod stationary until the cam 37 comes into position to shift the lever 34 into its other position. During the threading operation the cam 37 on the cam drum 5 is shifted so that on the completion of such threading operation it will be in position to engage the roll 35 of the lever 34 and shift the lower end of this lever inwardly and the upper end thereof outwardly, as shown in dotted lines in Fig. 2, thereby reversing the movement of the cam slide 29 and carrying the cam slide away from its locking position and into position to have the projecting portion 31 of this slide engage the friction roll 23' of the crank lever 23 and shift such lever with the slide, thereby reversing the crown gear and the bevel gear and so carrying the arms 17 away from the clutch member 11 and into position where such arms will not interfere with the proper rotation of the turret and the spindle, at which time the springs 9 will force the clutch member 11 into engagement with the clutch member 12, whereupon the rod spindle will be again rotated in the usual manner.

In the present mechanism the turret casing is shown cut away, as at 50, to permit the proper shifting of the lever arms 17 out of the way, in the manner indicated.

From the foregoing it will be observed that the clutch members will be positively released and held in such released position, being locked therein by the cam slide edge 32 until the proper threading of the work has been accomplished, after which the reëngagement of the clutch members and the continued rotation of the rod spindle is permitted, each successive rod spindle being carried into position by means of the revoluble turret to have its clutch similarly operated. In practice the sliding cam 29 may be suitably adjusted to properly position such cam.

From the foregoing it will also be observed that the friction clutch members are released by means of an actuator, comprising the lever arms 17 shifted by suitable gearing, which in turn is operated by a suitable cam slide actuated by cam mechanism carried by the cam drum.

I claim as my invention:

1. The combination with a rotatable turret and a plurality of rotatable spindles carried thereby, and a clutch for each spindle, of an actuator for said clutches adapted to be brought into operative relationship thereto by the indexing of said turret, a shaft journaled in stationary bearings and on which said actuator is mounted, a shaft at an angle to said first-mentioned shaft and gearing connecting said shafts, a shaft extending parallel to the axis of the turret, and operative connections between said last-mentioned shaft and the second-mentioned shaft whereby said second-mentioned shaft may be rocked to operate the actuator to shift said clutches.

2. The combination with a rotatable turret and a plurality of spindles carried thereby, and a clutch for each spindle, of an actuator for said clutches adapted to be brought into operative relationship thereto by the indexing of said turret, an actuator carrying shaft, a shaft at an angle to said actuator-carrying shaft and gearing connecting said shafts, a shaft extending parallel to the axis of the turret, and operative connections between said last-mentioned shaft and the second-mentioned shaft, whereby the latter shaft may be operated to operate the actuator to shift said clutches.

3. The combination with a rotatable turret and a plurality of spindles carried thereby, and a clutch for each spindle, of an actuator for said clutches adapted to be brought into operative relationship thereto by the indexing of said turret, an actuator-carrying shaft, a shaft at an angle to said actuator-carrying shaft and gearing connecting said shafts, a shaft extending parallel to the axis of the turret, and operative connections between said last-mentioned shaft and the second-mentioned shaft whereby the latter shaft may be operated to operate the actuator to shift said clutches, said connections comprising a cam-engaging lever carried by said second mentioned shaft and a cam slide adapted to engage said lever, said slide having a recessed part and also having a locking surface for locking the lever and thereby the actuator in a certain position.

4. The combination with a rotatable turret and a plurality of spindles carried thereby, and a clutch for each spindle, of an actuator for said clutches adapted to be brought into operative relationship thereto by the indexing of said turret, an actuator-carrying shaft, a shaft at an angle to said actuator-carrying shaft, means for imparting motion from one shaft to the other, a shaft extending parallel to the axis of the turret, and operative connections between said last-mentioned shaft and the actuator-carrying shaft whereby said actuator-carrying shaft may be rocked to operate the actuator to shift said clutches.

5. The combination with a rotatable turret and a plurality of spindles carried thereby, and a clutch for each spindle, of an actuator for said clutches adapted to be brought into operative relationship thereto by the indexing of said turret, an actuator-carrying shaft, a shaft located at an angle to said actuator-carrying shaft, driving connections between said shafts, a driving shaft, and operative connections between said driving shaft and the second-mentioned shaft whereby the latter may be actuated to operate the actuator to shift said clutches.

6. In a multiple spindle screw machine, the combination with a bed and a rotatable turret supported thereon and carrying a plurality of normally rotating rod spindles each having clutch members, of means for separating such members thereby to stop the spindles successively for a predetermined period and comprising a swinging actuator, a shaft for supporting said actuator, a bevel gear mounted on said shaft, a crown gear in mesh with said bevel gear, a shaft for supporting said crown gear, a lever fixed to said crown gear shaft, a cam slide adapted to shift said lever, and means for shifting said cam slide.

7. In a multiple spindle screw machine, the combination with a bed and a rotatable turret supported thereon and carrying a plurality of normally rotating rod spindles each having clutch members, of means for separating such members thereby to stop the spindles successively for a predetermined period and comprising a swinging actuator, a shaft for supporting said actuator, a bevel gear mounted on said shaft, a crown gear in mesh with said bevel gear, a shaft for supporting said crown gear, a lever fixed to said crown gear shaft, a cam slide adapted to shift said lever, and means for shifting said cam slide, said cam slide having a surface effective to lock the lever carried by the crown gear shaft in a certain position.

8. In a multiple spindle screw machine, the combination with a bed and a rotatable turret supported thereon and carrying a plurality of normally rotating rod spindles each having clutch members, of means for separating such members thereby to stop the spindles successively for a predetermined period and comprising a pair of shafts located at an angle one to the other, meshing gears carried by the shafts, a clutch actuator supported by one of said shafts, a cam-engaging lever carried by the other of said shafts, a cam slide adapted to engage said lever, and cam mechanism for shifting said slide.

9. In a multiple spindle screw machine, the combination of a bed, and a rotatable turret supported thereon carrying a series of normally rotating rod spindles each having friction clutch members, of means for separating said members thereby to stop the spindles during a predetermined period and comprising a pair of shafts located at an angle one to the other, meshing gears carried by said shafts, a swinging actuator carried by one of said shafts, a cam actuated lever carried by the other of said shafts, a cam slide having means for shifting said lever into different positions to effect the releasing of the clutch members and to permit the reengagement thereof, said slide also having a locking surface for locking said lever in a certain position, a swinging lever in engagement with said slide, and cam mechanism for shifting said lever into different positions.

OSCAR A. SMITH.

Witnesses:
I. G. Loe,
P. F. Mellinger.

---

Copies of this patent may be obtained for five cents each, by addressing the "Commissioner of Patents, Washington, D. C."